US006718183B1

(12) United States Patent
Blust et al.

(10) Patent No.: US 6,718,183 B1
(45) Date of Patent: Apr. 6, 2004

(54) SYSTEM AND METHOD FOR REDUCING DATA QUALITY DEGRADATION DUE TO ENCODING/DECODING

(75) Inventors: Stephen M. Blust, Lawrenceville, GA (US); Melvin D. Frerking, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/873,427

(22) Filed: Jun. 5, 2001

(51) Int. Cl.[7] .................................................. H04B 1/38

(52) U.S. Cl. ......................................... 455/560; 341/50

(58) Field of Search ................................ 455/560, 561, 455/553, 552, 552.1, 553.1; 704/212, 221, 200; 395/2.21, 2.3, 2.37, 2.39; 234/69, 70; 375/295, 222, 241, 242, 240; 341/50, 75, 77, 82, 99, 155

(56) References Cited

U.S. PATENT DOCUMENTS 5,903,862 A * 5/1999 Weaver et al. .............. 704/212
5,995,923 A * 11/1999 Mermelstein et al. ....... 704/219
6,272,358 B1 8/2001 Brent et al.
6,324,515 B1 * 11/2001 Rabipour et al. ........... 704/500
6,363,339 B1 3/2002 Rabipour et al.
2001/0014609 A1 8/2001 Yang

FOREIGN PATENT DOCUMENTS

WO PCT/US02/17478 4/2002

* cited by examiner

*Primary Examiner*—Nay Maung
*Assistant Examiner*—Tu Nguyen
(74) *Attorney, Agent, or Firm*—Shaw Pittman LLP

(57) ABSTRACT

Transliteration architectures reduce the number of encoding/decoding steps required to transmit telephony data. The reduction of encoding/decoding steps improves the quality of the transmitted data due to the avoidance of the significant adverse effects on the data from encoding and decoding. The reduction is accomplished using a transliterator device or through bypassing the transliterator device. A universal vocoder is proposed that allows the vocoding element to encode or decode data according to any desired vocoder format. Network routing considerations allow optimal decisions on which vocoder formats to use. Network routing decisions can be made based on vocoder formats used.

32 Claims, 12 Drawing Sheets

SYSTEM AND METHOD FOR REDUCING DATA QUALITY DEGRADATION DUE TO ENCODING/DECODING

BACKGROUND

1. Field of Invention

The present invention relates generally to the field of telecommunication systems. More particularly the present invention relates to the field of reducing data quality degradation due to encoding/decoding.

2. Background of the Invention

One of the key issues in wireless communications is quality of the service. For voice communications, one measure of quality is the performance of the speech handling systems. An ideal wireless system provides a communications path that is noise free and has high fidelity of reproduction of speech and music. Additionally, because of the preponderance of voice band data applications using modems, the same wireless communications path should ideally support the voice band modems in use on the wireline network.

Unfortunately, this ideal cannot be obtained in commercially practical wireless communications systems that must balance cost and capacity against superb audio quality. Given that the service offered in traditional mobile telephony systems is to enable effective voice communications mainly carrying speech, the wireless speech transport mechanisms purposefully fall short of the ideal.

In analog mobile systems the radio channel bandwidth allocation allows for a speech system, that using FM modulation, can transport a speech band from about 300 Hz to about 3,300 Hz. This is sufficient for a reasonably high fidelity communications system that handles speech, "music-on-hold," and medium speed modem data. The analog system is good enough in its fidelity and reproduction capability that multiple cascaded analog connections produce negligible degradation. In fact, prior to the vast digitalization that has taken place, wireline telephony service providers using analog communications circuits could carry the same 300 to 3,300 Hz communications channel across continents and oceans while essentially retaining the quality. The most significant degradation in the analog systems is accumulated noise. This is the pops, crackles, and other perturbations that one traditionally notices.

The advent of digital electronics has changed the nature of the communications channel. While a digital signal does not suffer from the accumulated noise impacts and can remain virtually pure no matter how far it is transported, there is a weak link in the chain of quality. To obtain a digital signal, the analog speech must be converted to a digital form. This conversion process, within the practical constraints of cost effective technology, introduces impairments (i.e., degradation) in the 300 to 3,330 Hz speech channel.

The "high end" of digital telephony is considered to be the conversion of the analog to a digital signals at a rate of 64 kbps. As these signals are transported, there arises the need to convert the signals back to analog form. Often the signal is converted back to digital again. Each analog to digital conversion (and its counterpart digital to analog conversion) adds an additional amount of impairment to the original signal. In the case of the 64 kbps digital signal, approximately 8 tandem analog/digital conversions can be tolerated before the quality is reduced to unacceptable levels.

In mobile communications, the driver for digital telephony has been increased capacity. To achieve additional capacity in the same channel bandwidth allocations previously used by analog FM systems, it is necessary to use an analog to digital conversion technique that encodes the speech at a rate much less than 64 kbps.

As the number of bits per second is reduced, the impairments introduced by the analog to digital conversion and coding process become increasingly large. As encoding rates are reduced, the susceptibility of the payload to impairments in the transmission medium increases. Each information bit becomes more important since it now represents a larger fraction of the desirable information payload. Thus, degradation over a fixed bit error rate channel will increase with lower bit rate encoding schemes. For example, at an 8 kbps coding rate, more than one set of encoding and decoding leads to significant problems. At a 4 kbps coding rate, more than two sets of encoding and decoding produces a virtually unusable communications path.

The issues are much the same for wireless mobile data (as opposed to wireless LANs). While certain quality requirements are different for data than voice, i.e., moderate delay is acceptable for data, but corruption of bit order or loss of bits is totally unacceptable, the issues described above are equally applicable. Data interworking may require rate adaptation, protocol conversion, error correction, etc. Often the interworking of disparate data networks requires treatment of the physical layer and also adaptation of the content, up to and including the presentation layer. This implies that one may need to address all seven layers of the traditional OSI data model for data gateways, a quantum leap from voice interworking which would generally only need treatment of the first two (or possibly three) layers of the OSI model.

DEFINITIONS

The term "transliteration," as used herein means transforming a signal from one type of coding to another different type of coding.

The term "vocoder" as used herein means a voice codec as is commonly used in telephony networks to convert analog voice data to digital data representative of the analog speech and digital-to-analog conversions on digital data representative of analog voice data to the analog data according to predetermined algorithms. As is well-known in the art vocoder algorithms differ in complexity and effective bit rate to achieve varying levels of quality of the voice data as it is subjected to conversions.

SUMMARY OF THE INVENTION

The present invention provides architectures for using vocoders that are designed to improve the quality of the speech that traverses through the architecture.

A first preferred embodiment of the present invention is a modified "bypass" mode, in which the data is "massaged" prior to being sent. In conventional vocoder bypass, digital voice data can be sent through the base station and mobile switching center ("MSC") and any intervening network elements without modification. However, the intervening network might impair the data in some way. According to the present invention, the data is massaged prior to being sent through the intervening network to mitigate the effect of this impairment on the data.

A second preferred embodiment of the present invention is a "common inter-working facility" mode. According to the second preferred embodiment of the present invention, a "standard" vocoder format is defined. Prior to transmitting voice data to the receiving subscriber unit's MSC, it is converted to the standard format. The data is sent to the receiving mobile unit of the receiving subscriber unit's MSC, for conversion to whatever vocoder format the receiving subscriber unit normally uses. If the conversion is performed by the subscriber units, this embodiment can be combined with vocoder bypass to avoid conversions in the MSC. The standard format can be any arbitrary vocoder format.

In a third preferred embodiment of the present invention, vocoder "impersonation" is used. In this embodiment, the digital voice data is converted to the receiving subscriber unit's vocoder format. The converted data is then sent to the receiving subscriber unit. If the conversion is performed by the sending subscriber unit, vocoder impersonation can be combined with vocoder bypass to avoid conversions in the MSC.

A fourth preferred embodiment of the present invention uses vocoder "substitution." In vocoder substitution, a vocoder format is selected. The selected vocoder format must be available in each of elements that the voice data passes through, specifically, the sending subscriber unit, the receiving subscriber unit, and their MSCs. The data is converted to the selected format and sent to the receiving mobile unit. Where the subscriber units perform the conversions, vocoder bypass can be used to avoid any conversions in the MSC.

Which format to use depends on many factors, including which vocoder formats are being used, desired speech quality and processing capability of the subscriber units. The present invention provides for communication between the sending and receiving subscriber units to determine which vocoder format to use. In the preferred embodiment, this is done through messaging using the SS7 intelligent network associated with mobile telephony. Messages are sent between the sending and receiving subscriber units to determine which vocoder format to use. In some cases, that format may not be available to one or the other of the subscriber units. In that case, the required vocoder can be downloaded from a vocoder storage area. Alternatively, the decision can be made to perform all vocoding functions in the base station or MSC and not in the subscriber units.

Another consideration affecting data quality is the particular route the data takes through the intervening network. For example, when using bypass, any non-conforming element in the intervening network will require additional decoding and encoding steps. As described above, these steps degrade the quality of the underlying transmitted voice signal. Using the common channel signaling provided by SS7, the MSC can assign intervening network elements to handle the call. That is, the present invention can configure the intervening network to minimize impairments to the underlying voice data being transmitted. Another configuration consideration is tandem order. Where cascaded encoding/decoding is required, the order is chosen so that the highest quality encoding/decodings are performed first.

Further, the present invention describes the concept of a universal decoder. The universal decoder is preferably software or hardware configurable to implement any vocoder format. The universal vocoder is can be used to convert voice data to any desired vocoder format. In addition, in the receiving subscriber unit, the universal decoder can automatically determine the correct vocoder format. This can be done in a number of ways including a brute force method in which the incoming voice data is decoded against all vocoder formats in the universal decoder, and the best match is chosen. Preferably, the match is based on frame structure and error functions.

Thus, one object of the present invention is to reduce or eliminate the degradation of voice quality due to encoding and decoding.

Another object of the present invention is to use vocoder substitution to reduce degradation to voice data.

Another object of the present invention is to use vocoder translation to reduce degradation to voice data.

Another object of the present invention is to use vocoder bypass with data massaging to reduce degradation to voice data.

Another object of the present invention is to use vocoder impersonation to reduce degradation to voice data.

Another object of the present invention is to use vocoder substitution to reduce degradation to voice data.

Another object of the present invention is to assign intervening elements over which to route voice data.

Another object of the present invention is to apply a universal vocoder to reduce degradation to voice data.

Another object of the present invention is to reduce degradation when wireline networks communicate with wireless networks.

These and other objects of the present invention are described in greater detail in the detailed description of the invention, the appended drawings and the attached claims.

DETAILED DESCRIPTION OF THE PREFERRED EMBODIMENTS

The present invention is a system and method for improving speech quality in telecommunication systems. While the preferred embodiments of the present invention are described with respect to wireless telephony systems, there is no intent to limit the present invention to wireless telephony systems. Thus, the techniques described herein can be applied to any system in which data must be converted from one format to another, wherein the conversion process degrades the data.

In general, the present invention is an architecture for transmitting voice data from a sending subscriber unit to a receiving subscriber unit. The subscriber units can be any devices capable of sending data, including for example telephony devices such as, wireline telephone, wireless telephones, personal computers, personal digital assistants ("PDAs"), pagers, etc. The receiving and sending devices can also be switches or base stations on which vocoders required for the present invention are implemented. The present invention allows the sending subscriber unit to transmit voice data to the receiving subscriber unit so as to minimize degradation on the voice signal due to the encoding and decoding that the voice data usually undergoes prior to reaching the receiving subscriber unit. The present invention provides this impairment mitigation primarily by reducing the number of encoding/decoding steps that must be performed.

Figure 1:
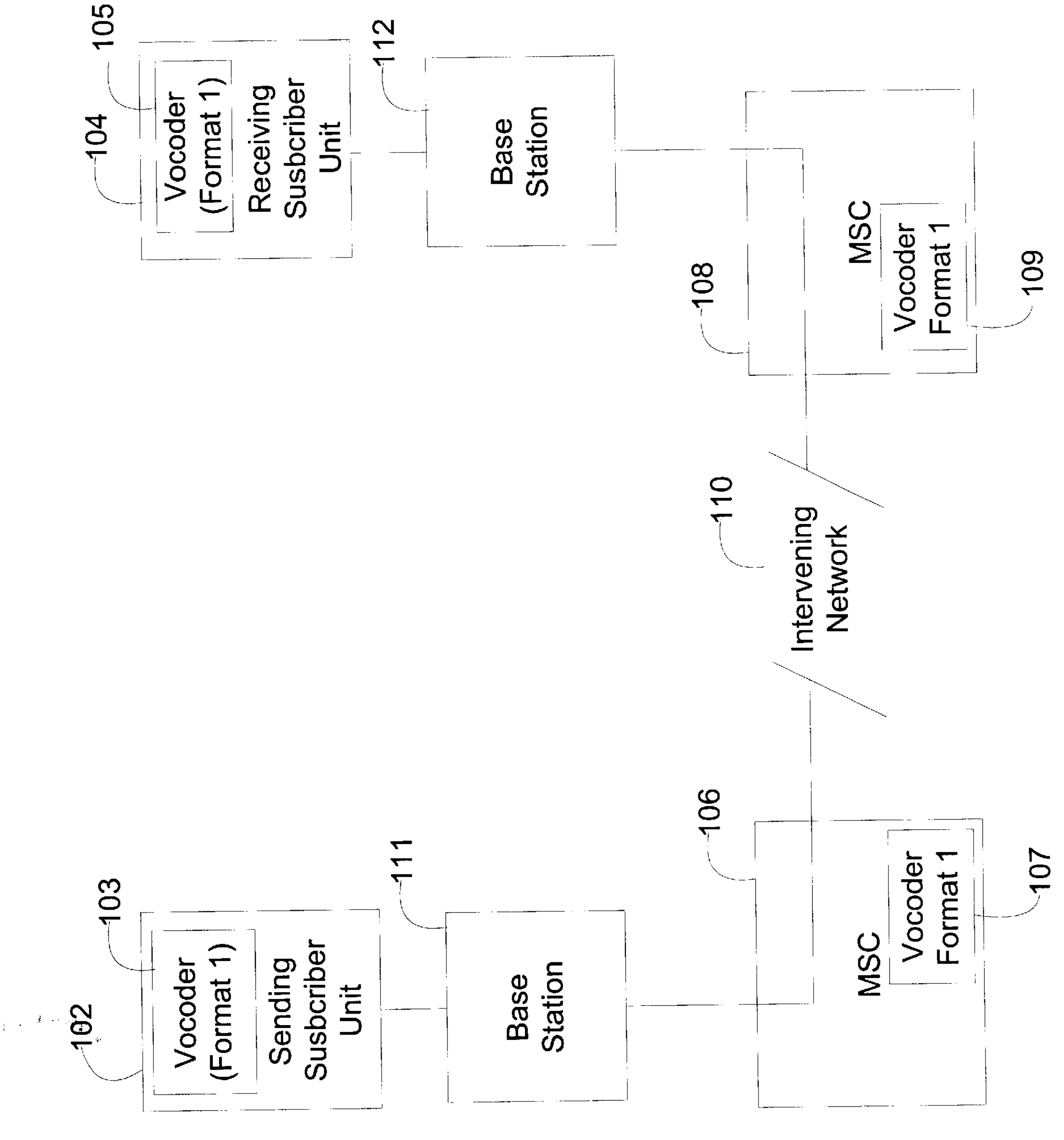
FIG. 1 is a schematic diagram of a system for transmitting data using vocoder bypass according to a first preferred embodiment of the present invention.

FIG. 1 is a schematic diagram of an architecture for a voice communication system according to the first preferred embodiment of the present invention. A sending subscriber unit 102 sends voice data to a receiving subscriber unit 104. Sending subscriber unit 102 communicates through a base station 111 to a mobile switching center (MSC) 106, and receiving subscriber unit 104 communicates through a base station 112 to an MSC 108. Between MSCs 106 and 108, in general, there can be intervening network elements 110.

In operation, the voice data is converted from analog data to digital data for transmission through the network shown in FIG. 1, by a vocoder 103. The digital data is received by receiving subscriber unit 104, where another vocoder 105 converts the received digital data back to analog, so that it can be played through a speaker on receiving subscriber unit 104. In addition, MSC 106 has a vocoder 107 which is conventionally used to convert the data to Pulse Code Modulation (PCM) data (even when the data is already in PCM format) for transmission to MSC 108. MSC 108 has a vocoder 109, which converts the received PCM data to the format required by receiving subscriber unit 104.

In the first preferred embodiment, sending and receiving subscriber units 102 and 104 use the same vocoder format, such as vocoder format 1. Because the sending and receiving subscriber units use the same vocoder format, no additional decoding/encoding steps need be performed by the vocoders located in MSC 106 and 108. Consequently, vocoders 107 and 109 in MSCs 106 and 108 respectively are bypassed. That is, the voice data from sending subscriber unit 102 is transmitted directly to receiving subscriber unit 104 without being processed by vocoders 105 and 107. MSCs 106 and 108 can be a single switch. In that case, vocoders 107 and 109 are on the same switch and can be the same vocoder.

In addition, according to the first preferred embodiment of the present invention, the voice data is massaged prior to being transmitted through the intervening network so that any degrading effect on the data can be substantially eliminated. Thus, the data is modified in anticipation of its transmission through intervening network elements 110.

Figure 2:
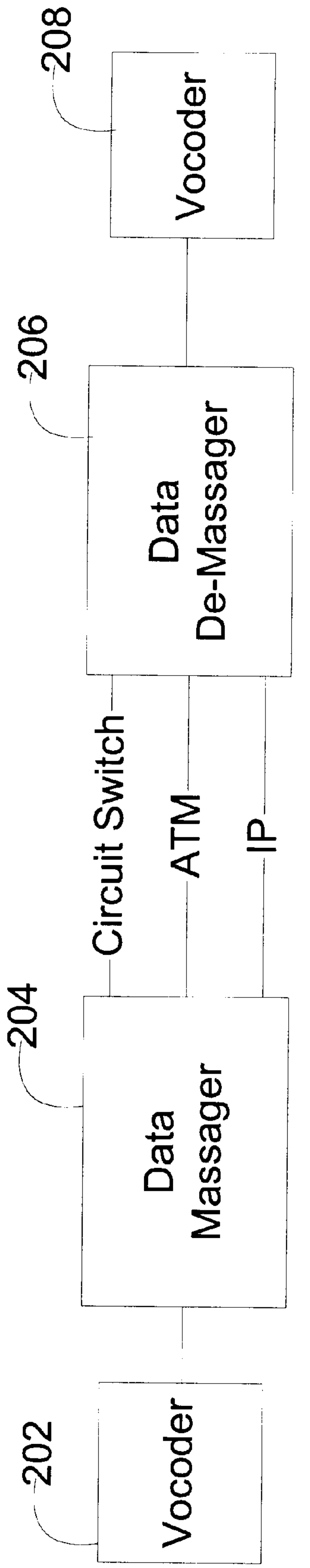
FIG. 2 is a schematic diagram of a system using a massager to massage data to mitigate the effects of any intervening network elements.

A schematic architecture for massaging the data is shown in FIG. 2. Referring to FIG. 2, voice data is generated by vocoder 202. The voice data is massaged in data massager 204. The data is massaged according to transmission characteristics of the intervening network. An exemplary transmission characteristic is the "packaging" of the data. For example, the data is likely to be packaged differently depending on whether it is destined to be transmitted using circuit switching, ATM or IP.

For example, bit robbing of the eighth bit is often performed on common T-carrier DSO systems to ensure a 56 kilobit per second bit rate. That is, the eighth bit of each data word is not sent. If the data massager of the present invention determines that it was sending data to a common T-carrier DSO, it would massage the data by populating all bits of each data word except that eighth bit. However, often that eighth bit is required by the intervening network elements, for example, as a status indicator. Consequently, in the preferred embodiment of the present invention, the eighth bit is set to the value that tells the intervening elements that the status is healthy, that is, there is no error.

At the receiving end, the data is "de-massaged," i.e. converted back to its original form by data de-massager 206. For example, in the case of T-carrier DSO, the eighth bit is added back to the data. The de-massaged data is sent to vocoder 208 in the receiving subscriber unit for processing.

For the bypass mode of operation, the vocoders can be located in the subscriber units 102 and 104, base stations 111 and 112 or MSCs 106 and 108. In addition, the vocoding functionality can be carried out by a service bureau. That is, the analog voice data is sent to third party service bureaus where it is encoded for subsequent transmission to the receiving subscriber unit. The service bureau is described in more detail below.

Figure 3:
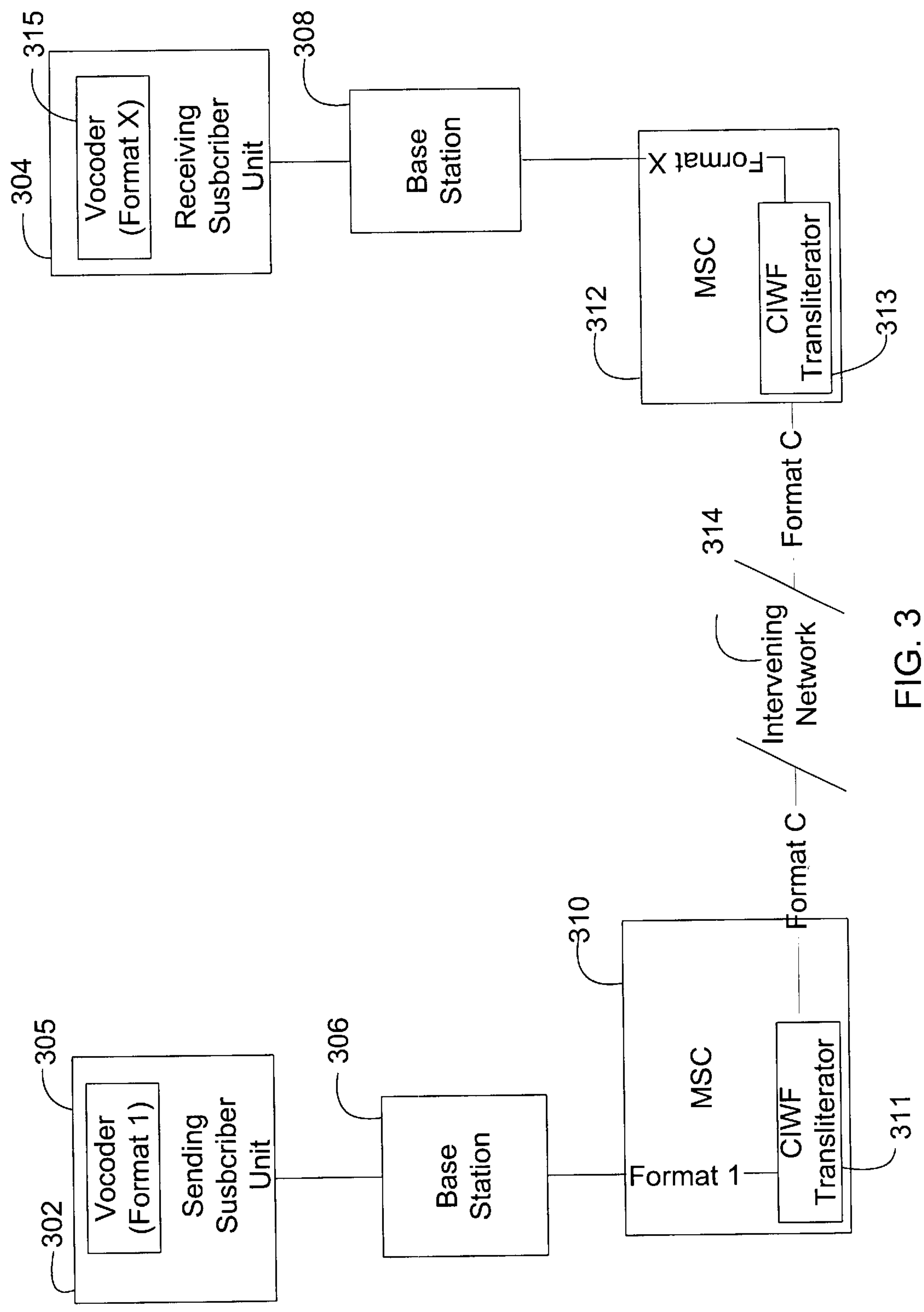
FIG. 3 is a schematic diagram of a system for transmitting data using a common interworking facility mode according to a second preferred embodiment of the present invention.

FIG. 3 is a schematic diagram of an architecture for reducing encoding/decoding operations on the voice data according to the second preferred embodiment of the present invention. This embodiment is referred to as a "common inter-working facility" (CIWF). Referring to FIG. 3, a subscriber unit 302 initiates a telephone call to a subscriber unit 304. Subscriber unit 302 converts the call to digital data using vocoder 305. The digital data is sent to a base station 306, which the subscriber unit 302 is in communication with, and on to an MSC 310. In MSC 310, the digital data is converted, or "transliterated" from vocoder format 1 to a common vocoder format, illustrated in FIG. 3 as vocoder format C. The transliteration is performed by CIWF transliterator 311. Vocoder format C is a common vocoder format that can be used by all of the elements in the communication architecture shown in FIG. 3.

The digital data in vocoder format C is sent through intervening network elements 314 (if there are any) to an MSC 312. In the general case, MSCs 310 and 312 can be a single MSC. A transliterator 313 in MSC 312 receives the digital data in common vocoder format C and outputs digital data in vocoder format X, the vocoder format to be sent to receiving subscriber unit 304 through base station 308. Vocoder 315 converts the digital data from format X to analog for presentation to the speaker in subscriber unit 304.

Note that transliterators 311 and 313 can be implemented in the base station rather than in MSCs 310 and 312. Further, vocoder format X can be, in the general case, vocoder format 1. However, if this were the case, the bypass mode described above would be the preferable transmission mechanism. Which format to use can be determined in numerous ways as will be described below.

An example where the CIWF mode might be used is in communication between vocoders adhering to the AMR and TDMA formats. The TDMA format is essentially a subset of the AMR format. Consequently, the vocoders can choose the TDMA format as the common format. Although, under this approach, the AMR voice quality is degraded to the level of the TDMA format, this degradation is likely to be far less than the degradation that would result from the additional encoding and decoding steps that would otherwise be required.

Figure 4:
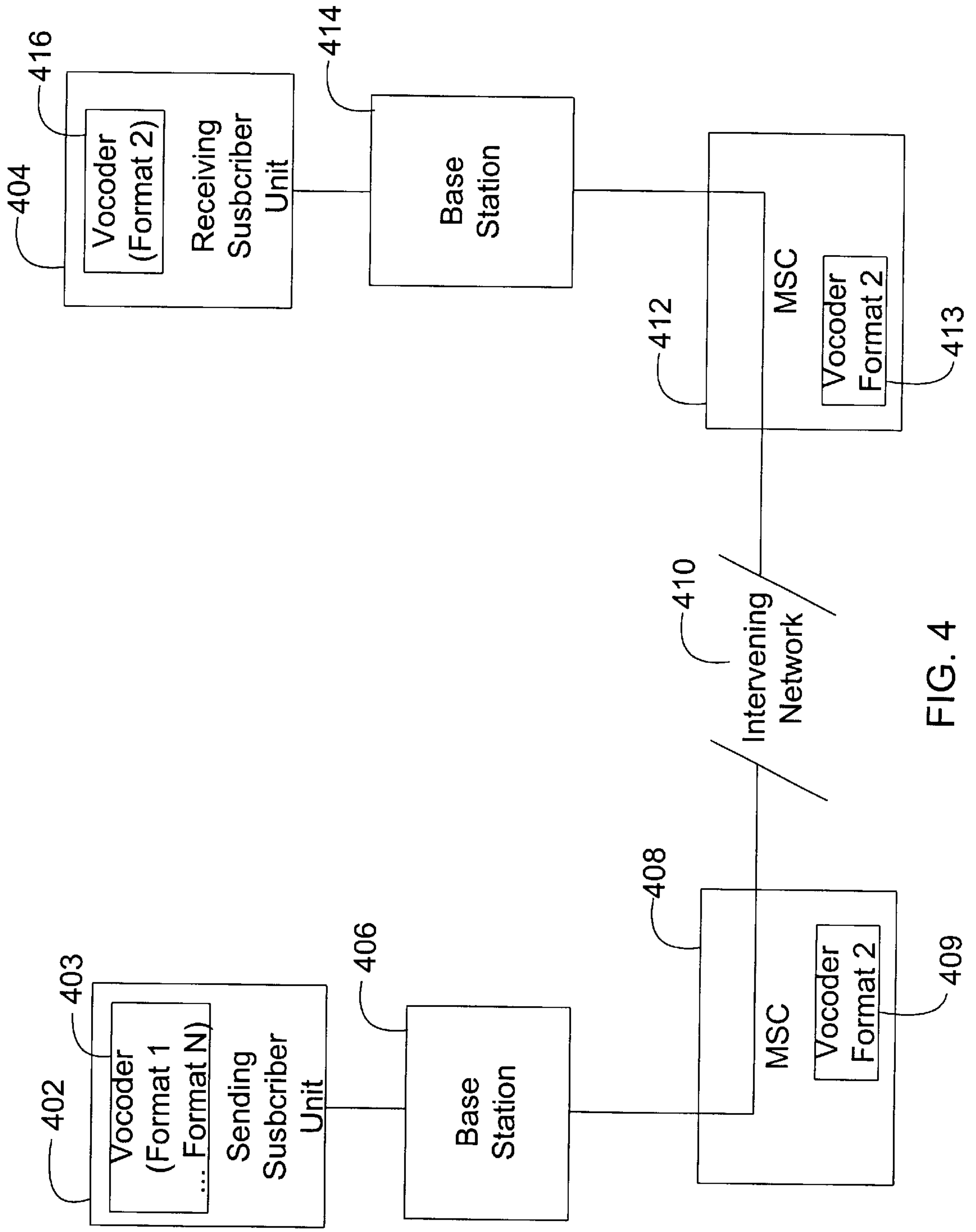
FIG. 4 is a schematic diagram of a system for transmitting data using vocoder impersonation with bypass according to a third preferred embodiment of the present invention.

The third embodiment of the present invention uses vocoder "impersonation." As shown in FIG. 4, in this embodiment subscriber unit 402 desires to establish communication with subscriber unit 404. Subscriber unit 402 has a vocoder 403 that can "impersonate" various vocoder formats 1-N. Subscriber unit 404 has a vocoder 416 that uses vocoder format 2. Vocoder format 2 is one of the vocoder formats subscriber unit 402 can impersonate. Subscriber unit 402 determines that it should use vocoder format 2 to digitize the voice data for transmission to subscriber unit 404. The digitized data (in vocoder format 2) is sent to MSC 408 through base station 406. A vocoder 409 in MSC 408 is bypassed as the subscriber units are communicating using the same vocoder format. The data is transmitted over any intervening network elements 410 to MSC 412. Again a vocoder 413 in MSC 412 is bypassed because the subscribers units are communicating using the same vocoder format. The digitized data is then sent via base station 414 to subscriber unit 404. The digitized data is converted to analog data so that it can be transmitted to a speaker on subscriber unit 404 by vocoder 416. The vocoding step can also be performed in the base stations or MSCs. In the general case, MSCs 410 and 412 can be a single MSC.

Vocoder impersonation can be combined with any other of the techniques described herein for reducing encoding/decoding steps. For example, if the vocoder cannot impersonate the receiving subscriber unit's vocoder format, the bypass technique cannot be used. However, another technique might be applicable. For example, it might be possible to use the CIWF mode described above. In this case, subscriber unit 402 sends digitized data according to its format and sends it to base station 406, which sends the data to MSC 408. A transliterator in either base station 406 or MSC 408 transliterates the digitized data to the common vocoder format. This data is sent through intervening elements 410 to MSC 412, which sends it to base station 414. A vocoder in either MSC 412 or base station 414 transliterates the transliterated data into a format that can be decoded by subscriber unit 404. The data is sent to subscriber unit 404 where it is decoded by vocoder 416.

Figure 5:
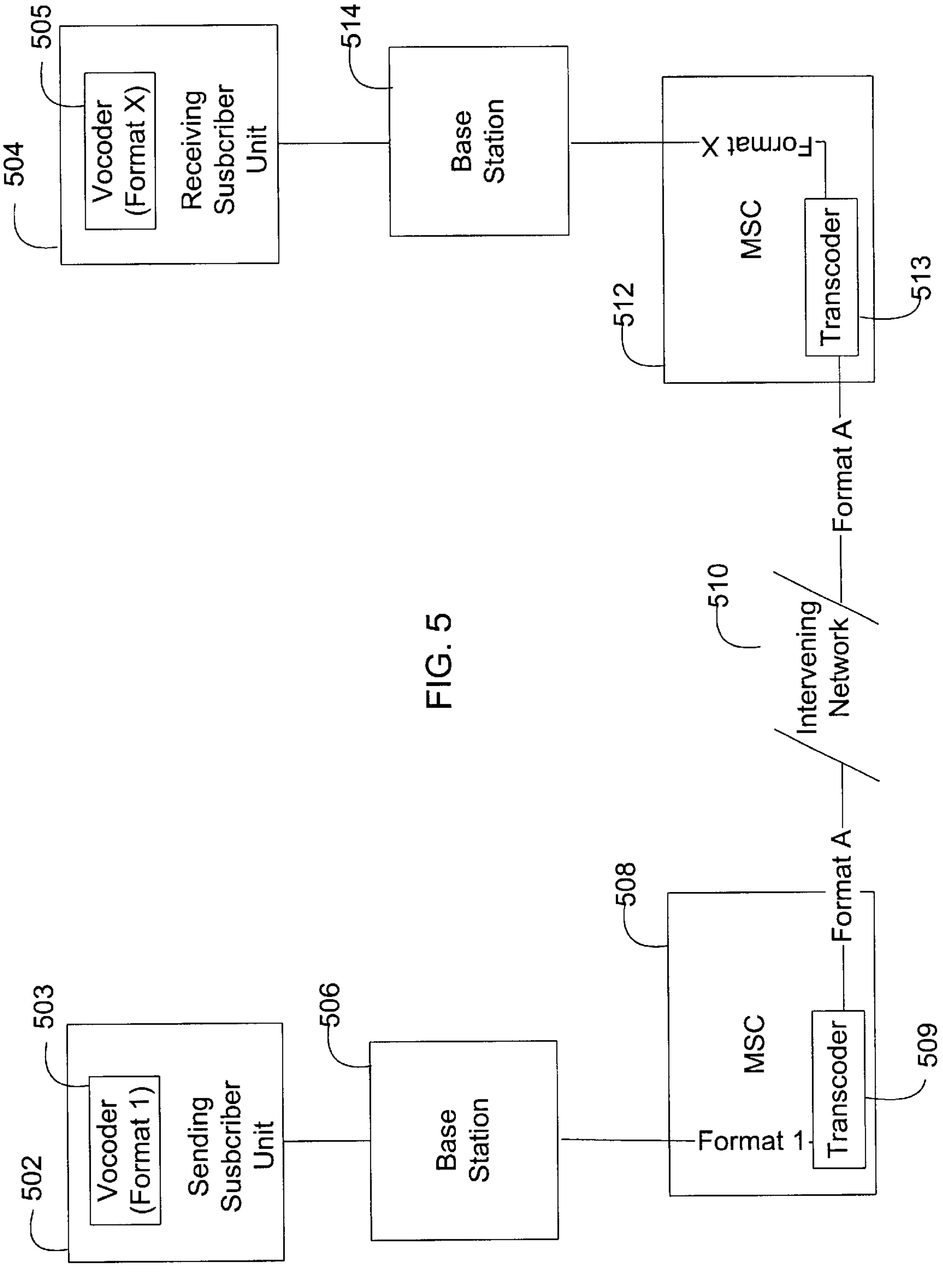
FIG. 5 is a schematic diagram of a system for transmitting data using vocoder translation with bypass according to a fourth preferred embodiment of the present invention.

The fourth embodiment of the present invention uses vocoder "substitution." As shown in FIG. 5. Referring to FIG. 5, sending subscriber unit 502 desires to establish communications with receiving subscriber unit 504. Vocoder 503 communicates with subscriber unit 502 using vocoder format 1. Vocoder 505 in receiving subscriber unit 504 uses vocoder format X. In the embodiment shown in FIG. 5, the data is "translated" from vocoder format 1 to vocoder format A by transcoder 509 in MSC 508. Vocoder format A is preferably chosen so as to minimize impairments when translating from vocoder format 1 to vocoder format A and from vocoder format A to vocoder format X. The translation is a digital-to-digital mapping. That is, there is no encoding or decoding required. Thus, there is no digital to analog conversion, followed by a subsequent digitization using vocoder format A.

In operation, data is digitized in sending subscriber unit 502 by vocoder 503, using vocoder format 1. The digitized data is sent through a base station 506 to an MSC 508. In MSC 508, the digitized data is translated to vocoder format A by transcoder 509 using digital-to-digital translation. The translated data is sent through any intervening network elements 510 to MSC 512. Although MSCs 510 and 512 are shown as separate MSCs, they can also be a single MSC.

A transcoder 513 in MSC 512 translates the data from vocoder format A to vocoder format X, the format that receiving subscriber unit 504 can process. The data in vocoder format X is sent through a base station 514 to receiving subscriber unit 504. The data in vocoder format X is converted to analog data by vocoder 505. The "translation" mode of FIG. 5 differs from the CIWF mode described above with respect to FIG. 3 in that it is a dynamic configuration depending only on the elements in communication at the time that vocoder format A is chosen. In the CIWF described above, the common vocoder format C is chosen and fixed prior to system operation.

Figure 6:
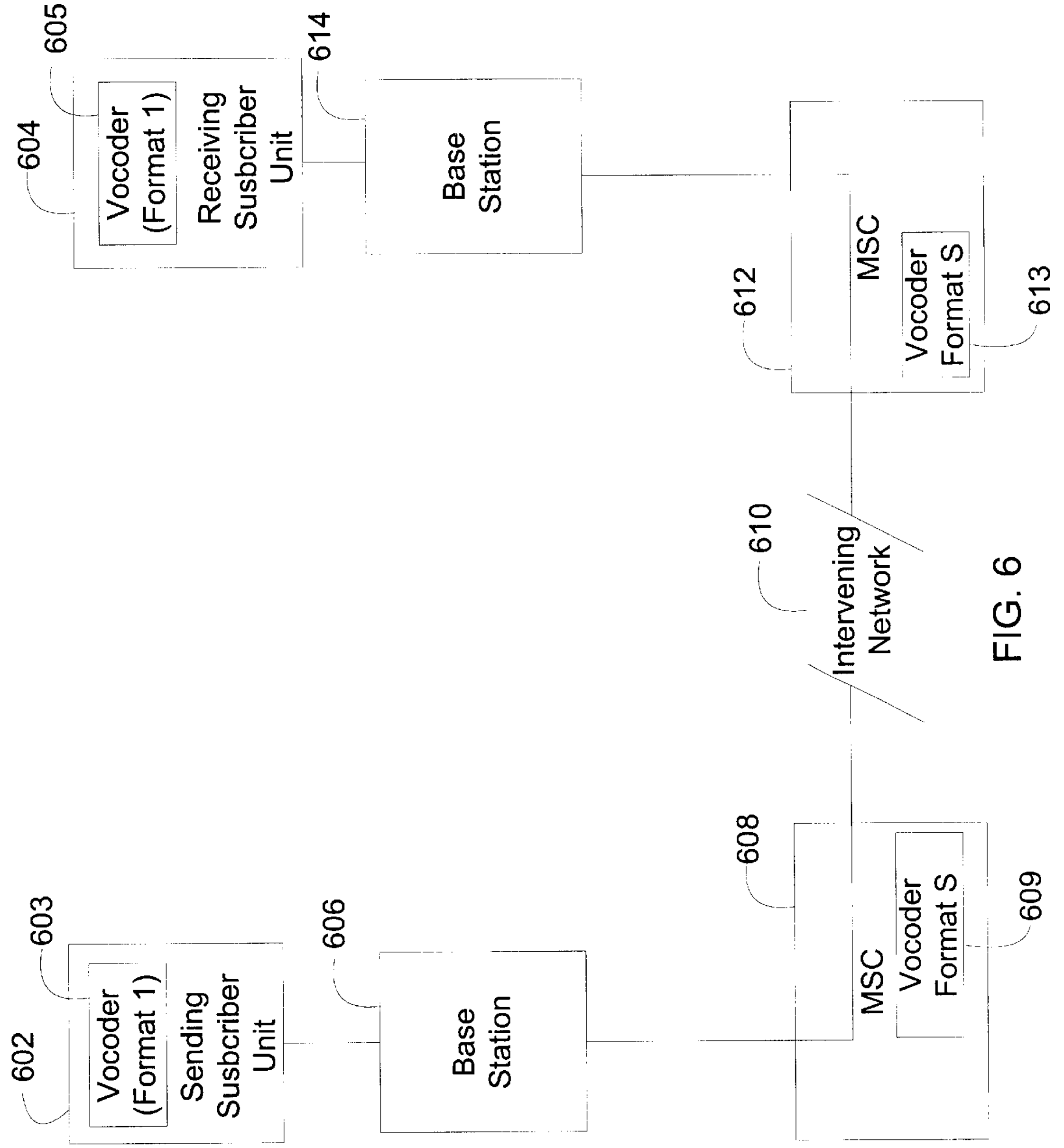
FIG. 6 is a schematic diagram of a system for transmitting data using vocoder substitution with bypass according to a fifth preferred embodiment of the present invention.

An alternate implementation of the fourth embodiment of the present invention is shown in FIG. 6. Referring to FIG. 6, sending subscriber unit 602 desires to establish communications with receiving subscriber unit 604. Sending subscriber unit 602 and receiving subscriber unit 604 can substitute a vocoder format S for their normal vocoder formats. Thus, sending subscriber unit 602 can substitute a vocoder 603 that adheres to vocoder format S for its normal vocoder. Likewise, receiving subscriber unit 604 can substitute a vocoder 605 that adheres to vocoder format S for its normal vocoder.

Analog voice data is digitized according to vocoder format S and sent through a base station 606 to an MSC 608. MSC 608 has a vocoder 609 that can adhere to vocoder format S. If bypass, as described above, is available, MSC 608 passes the digitized data through any intervening network elements 610 to an MSC 612. MSC 612 has a vocoder 613 that can adhere to the vocoder format S. Where the bypass mode of operation is available, MSC 612 passes the data on to base station 614, which in turn, passes the data to subscriber unit 604. A vocoder 605 in subscriber unit 604 converts the data to analog data for input to a speaker on receiving subscriber unit 604.

If the bypass mode is not available, then the digitized data is converted to analog data and digitized back to format S by vocoder 609 in MSC 608. This data is then sent to MSC 612. Likewise, if there is no bypass mode available, vocoder 613 converts the digital data to analog and then re-digitizes the data in vocoder format S.

Figure 7:
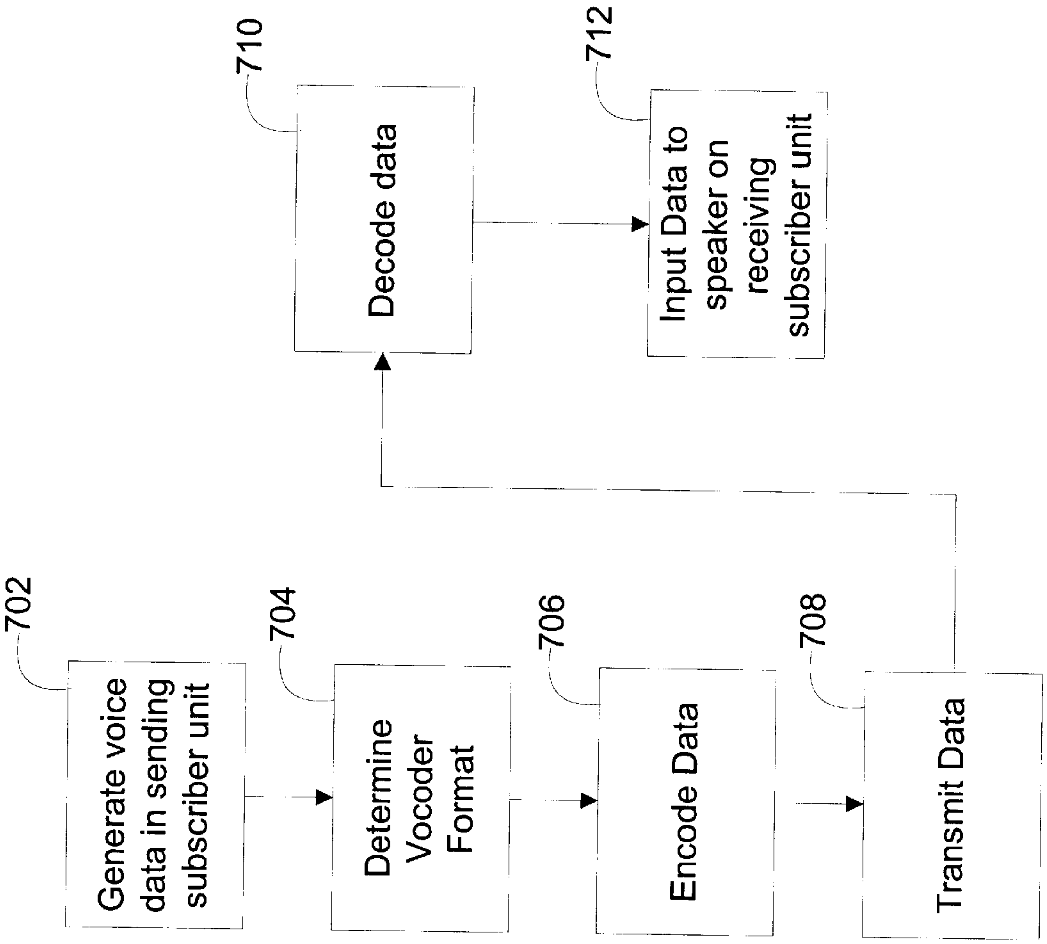
FIG. 7 is a flow chart illustrating a method for transmitting data according to the preferred embodiment of the present invention.

A method for practicing the present invention is illustrated in the flow diagram of FIG. 7. Referring to FIG. 7, analog voice data is generated in step 702 in the sending subscriber unit. For example, the analog voice data is generated when a person speaks into a microphone located on the sending subscriber unit. In step 704 the vocoder format to use is determined. This determination can take place at several points. The sending subscribing unit can make the determination, the base station can make the determination or the MSC can make the determination. How the determinations are made is described in more detail below. After the vocoder format is determined, the analog voice data is digitized according to the selected vocoder format in step 706. Steps 704 and 706 can be performed by the sending subscriber unit, the base station communicating with the sending subscriber unit, the MSC that sends the data, a combination of these elements, or a combination of these elements with any combination of the MSC that receives the data, the base station communicating with the receiving subscriber unit and/or the receiving subscriber unit. The digitized data is transmitted to the receiving subscriber unit through an MSC and a base station in step 708. The data may also be transmitted through intervening elements in step 708. The digital data is converted to analog data in step 710. Step 710 can be performed by the MSC to which the data is sent, the base station communicating with the receiving subscriber unit or the receiving subscriber unit. The analog data is then input to a speaker in the receiving subscriber unit in step 712.

In operation, there are several ways for choosing which vocoder format to use according to the preferred embodiments of the present invention. One way of making this determination requires that the sending and receiving unit communicate their capabilities with one another. Such communication can occur over the SS7 network during call set-up. For example, using the short messaging service (SMS), the subscriber units can communicate to one another in 160 character messages to determine which vocoder format to use. The subscriber units decide between themselves which vocoder format to use. The choice will depend on which vocoder formats are available to the subscriber units, desired quality, air link bandwidth.

In this mode of operation, the subscriber units would have to be able to impersonate other vocoders as described above. One advantage is that after the impersonation, the bypass mode will often be available. If they could not impersonate other vocoders, the subscriber units could default to CIWF or vocoder translation. If they determined that they used the same format, bypass would be the preferred method of data transmission.

Alternatively the decoder choice can be made in the MSC or in the base stations. When there is only one MSC or base station, the MSC or base station polls the sending and receiving subscribing units to determine which vocoder formats they use. Depending on the formats, the MSC or base station can decide which vocoders to employ. For example, if the sending and receiving subscriber unit use the same vocoding format, the MSC or base station can simply bypass vocoding altogether as described above. If they differ, the MSC or base station determines the vocoder to use to impose the minimum impairment on the voice signal.

If there are two MSCs or base stations, MSCs communicate with one another and their respective subscriber units to determine which of the above vocoding modes to employ, and which vocoding formats to use. Again, the decision on vocoding format depends on what is available to the subscriber units, MSCs and/or base stations as well as acceptable impairment levels. When vocoding decisions are performed by the MSCs or base stations, any of the above vocoding methods can be used.

Rather than polling the subscriber units to determine the vocoding, the MSC or base station can alternatively determine the decoder formats by examining the decoder data using an automatic determination. Preferably, the automatic determination is made using known parameters of the decoded signal. For example, frame structure and/or error functions can be determined. Using knowledge of the frame structure and/or error functions, several vocoders can be tested to determine which produces the best data. The vocoder producing the best data is chosen as the vocoder to use.

This automatic determination leads into another technique for making the vocoder determination. This technique is referred to as a "universal decoder." A universal vocoder can impersonate any known vocoder. In addition, the universal vocoder preferably determines the format of the incoming vocoder data automatically. Alternatively, the universal vocoder can be sent information, as described above, instructing it which vocoder to use. The universal vocoders of the present invention can be implemented in subscriber units, base stations and MSCs.

Figure 8A:
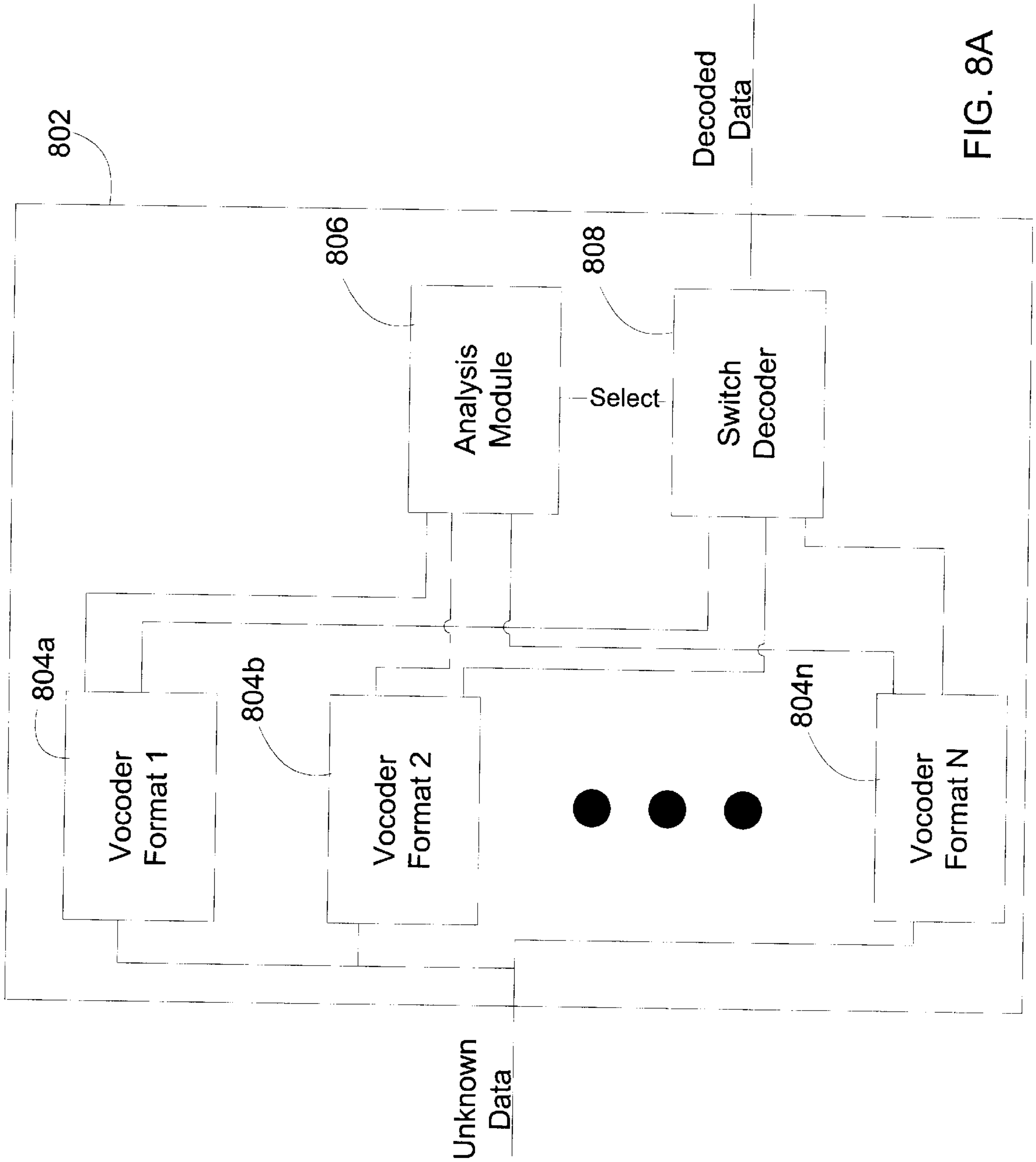
FIG. 8A is a schematic diagram for a first preferred embodiment of a universal vocoder.

FIG. 8A is a schematic diagram of a first embodiment of a universal vocoder according to a preferred embodiment of the present invention. Vocoder data having an unknown format is presented to a universal vocoder 802. Universal vocoder 802 comprises N vocoders 804*a*–804*n*. Each of the N vocoders can process the incoming data according to a different vocoder format. Together, the N vocoders can preferably process any known vocoder format. Alternatively, any subset of vocoders representing a subset of the known vocoder formats can be used without limitation.

The incoming data is processed by each of the N vocoders. The processed data is input to an analysis module 806. Using various parameters, analysis module 806 determines which vocoders' output is the best, i.e., the most likely to be the correct vocoder to decode the unknown incoming data. This determination is made by determining frame size and/or processing error functions to determine which data is likely to be the correctly decoded data. Error functions analysis can be used in those vocoders that send error signals as their data. Analysis module 806 generates a select signal that triggers a switch or decoder to allow the decoded data corresponding to the most likely vocoder pass through as the output of universal vocoder 802. Universal vocoder 802 can be implemented in hardware or software, as would be apparent to those skilled in the art.

Figure 8B:
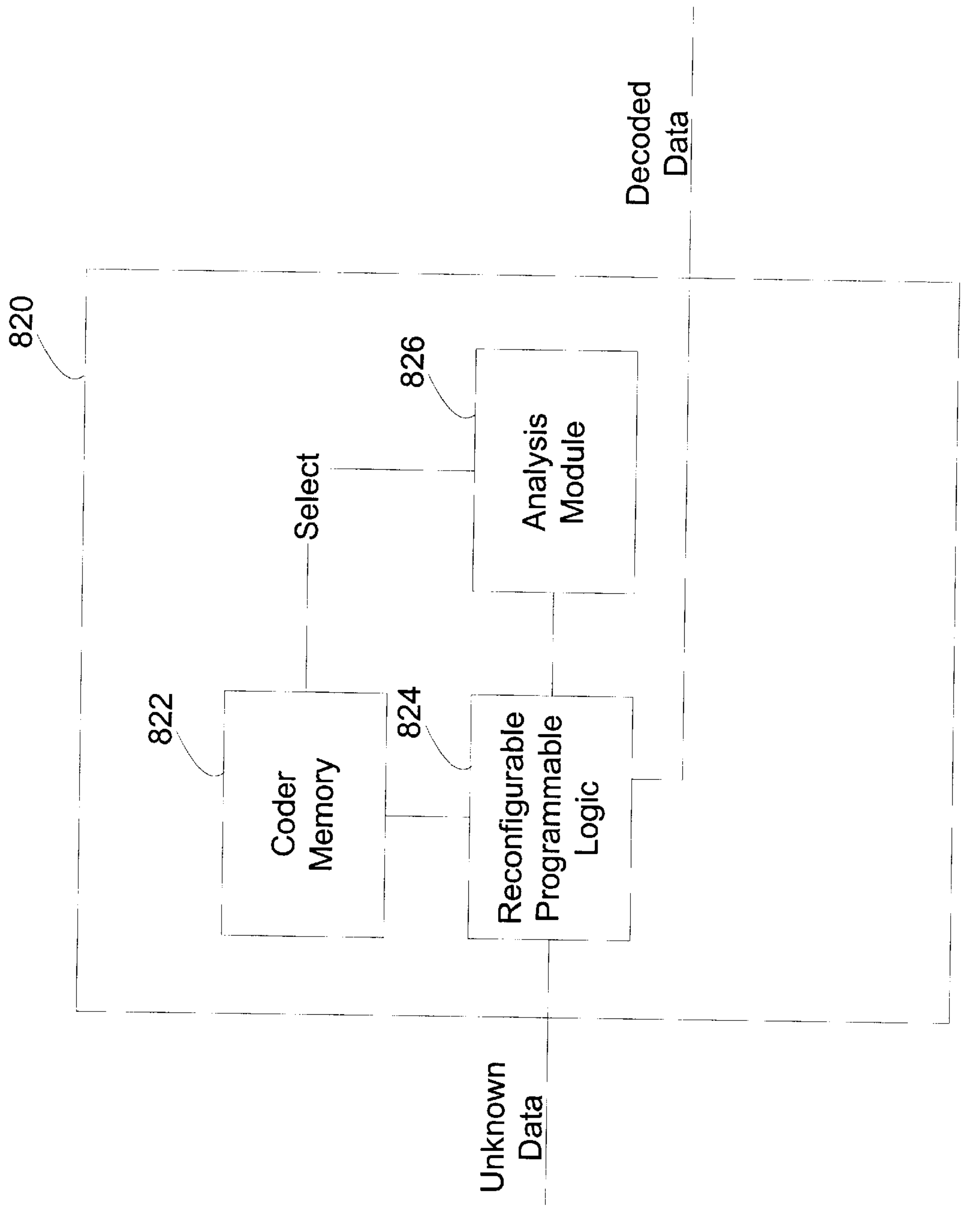
FIG. 8B is a schematic diagram for a second preferred embodiment of a universal vocoder.

FIG. 8B is a schematic diagram of a second embodiment of a universal vocoder according to a preferred embodiment of the present invention. Referring to FIG. 8B, data having an unknown vocoder format is input to a universal vocoder 820. Universal vocoder 820 comprises a reconfigurable vocoder 824. Reconfigurable vocoder 824 can be firmware, for example, a field programmable gate array or software, for example, or a data structure. A vocoder memory 822 stores vocoder implementations to process all known vocoder formats. Alternatively, any subset of known vocoder implementation can be stored in vocoder memory 822. In operation, an analysis module 826 causes each vocoder implementation to be implemented in turn in reconfigurable vocoder 824. Analysis module 826 then analyzes the vocoder output and generates a score that is stored. The score is based on the quality of the output. As described above, the quality of the output can be determined by looking at frame structure and/or error functions.

After all of the vocoder implementations stored in vocoder memory 822 and scores are generated, analysis module 826 generates a select signal to vocoder memory 822. The select signal corresponds to the vocoder implementation having the highest score. Vocoder memory 822 stores the vocoder implementation corresponding to the select signal in reconfigurable vocoder 824. The vocoded output is decoded data. The select signal also toggles a mode switch. The mode switch indicates that reconfigurable vocoder 824 is in the analysis mode or the output mode. Reconfigurable vocoder 824 is in analysis mode when the vocoder format is being determined. Reconfigurable vocoder 824 is in output mode after the format has been determined and it generates decoded data.

Figure 8C:
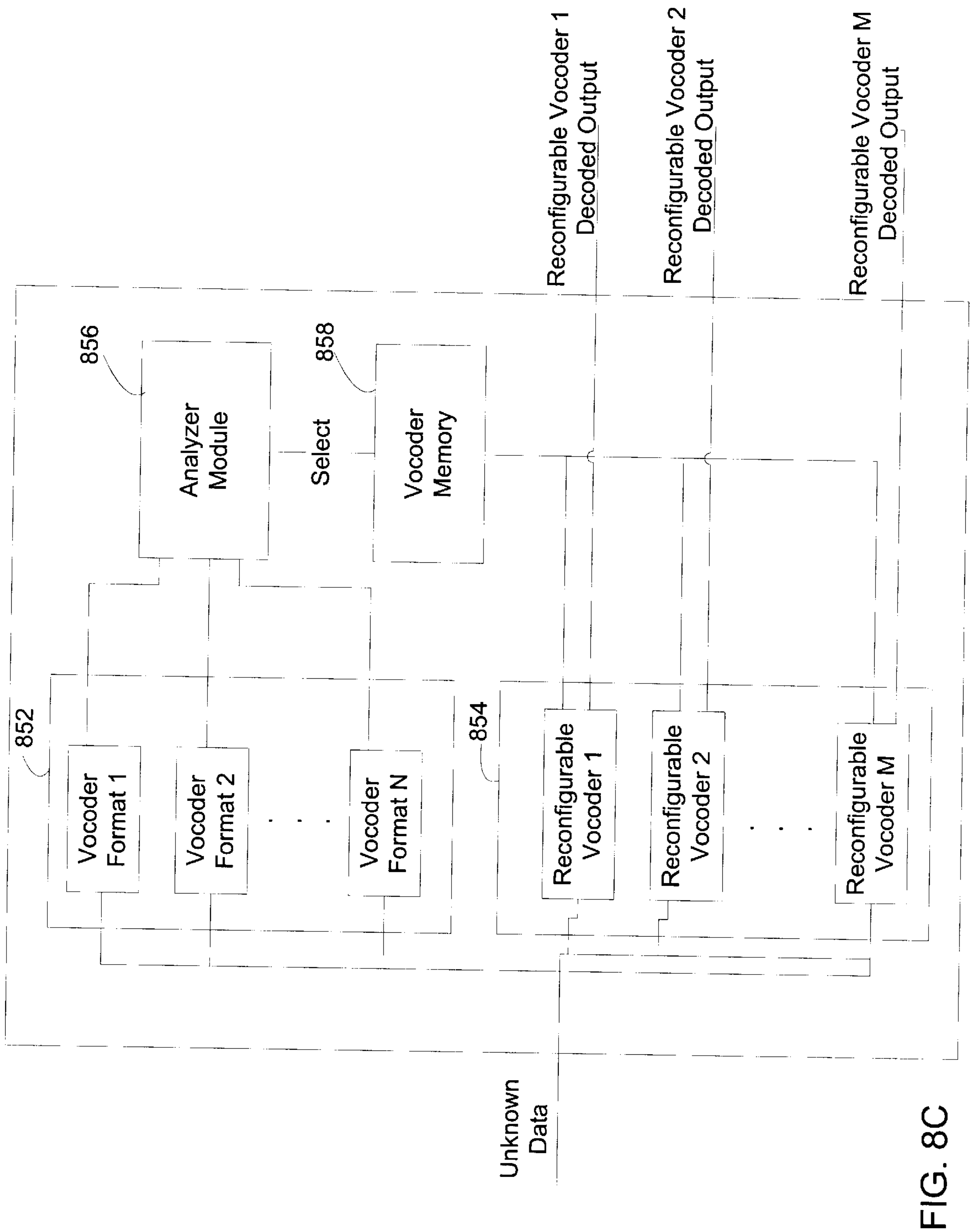
FIG. 8C is a schematic diagram for a third preferred embodiment of a universal vocoder.

A third embodiment of a universal vocoder according to a preferred embodiment of the present invention is illustrated schematically in FIG. 8C. Referring to FIG. 8C, universal vocoder 850 comprises a vocoder bank 852 having N vocoders. Preferably the N vocoders correspond to all known vocoder formats. In an alternate embodiment, any subset of vocoder formats can be implemented. In addition, universal vocoder 850 includes a bank of M reconfigurable vocoders. M can be from 1 to any number fitting within the constraints of the system on which the universal vocoder of the present invention is implemented. The M vocoders allow up to M vocoded streams to be decoded simultaneously.

In operation, unknown data is simultaneously submitted to the bank of N vocoders in vocoder bank 852. The outputs of the N vocoders is sent to an analysis module 856. Using the frame structure or error function as a metric as described above, analysis module 856 determines the most likely vocoder format to decode the unknown data. Preferably, analysis module 856 generates a select signal corresponding to the vocoder determined to be the best. The select signal is input to a vocoder memory 858 to output vocoder implementation data corresponding the best vocoder format for the unknown data to the bank of M reconfigurable vocoders in reconfigurable vocoder bank 854. This vocoder implementation data is used to configure the next available reconfigurable vocoder in reconfigurable vocoder bank 854. An up/down counter (either hardware or software depending on implementation) can be used to track the next available reconfigurable vocoder to be used. Reconfigurable vocoders are put back into the available vocoder pool when a call completes.

The universal vocoders described above can also process data on the sending side according to any of the known vocoder formats or any subset thereof. This is accomplished by using the select signal to select the desired vocoder format. In one embodiment, a universal vocoder is located in the sending subscriber unit and the select signal is generated by the base station or MSC.

Several of the embodiments of the present invention described above require a vocoder configuration that is able to process data in any of a number of vocoder formats. The universal vocoder is one embodiment for doing this. When the vocoder is in the base station or in the MSC, the universal vocoder concept or bank of vocoders adhering to the known vocoder formats or subset thereof is satisfactory for accomplishing the task. However, for vocoders located in subscriber units, memory constraints can eliminate these possibilities for having a vocoder capable of handling a plurality of formats. To overcome these difficulties, the required vocoder implementation can be downloaded to the subscriber unit when it is required. That is, the subscriber unit communicates with the base station to have the vocoder implementation downloaded to it. The downloaded vocoder implementation configures programmable logic or contains software to perform vocoding according to the required format. The bases station can store the vocoder implementations or obtain them from the MSC.

Figure 9:
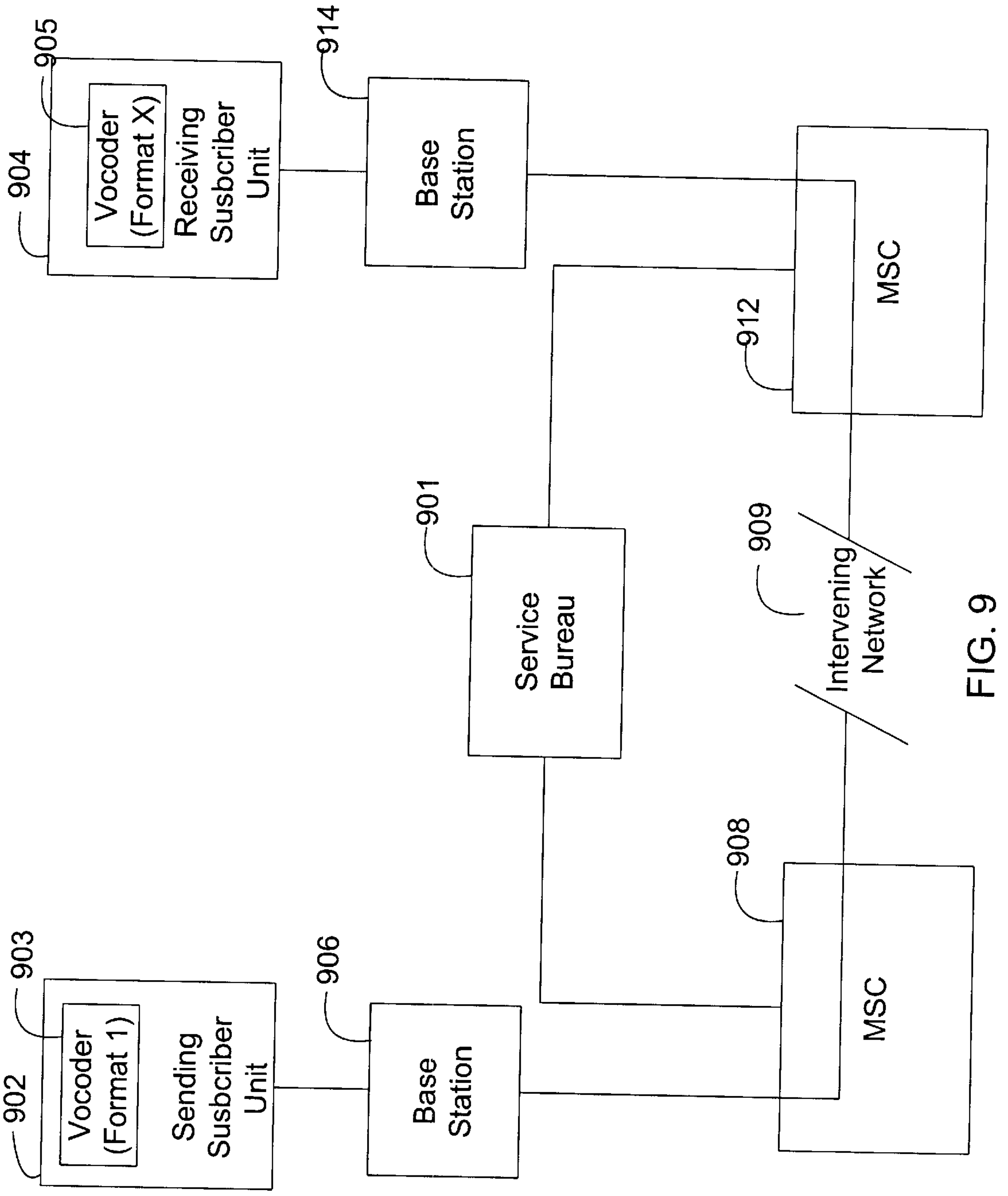
FIG. 9 is a schematic diagram of a system for providing vocoder services using a service bureau according to another preferred embodiment of the present invention.

In one embodiment of the present invention, a service bureau is established that performs the encoding and decoding service for its customers. Referring to FIG. 9, a sending subscriber unit 902 desires to communicate with a receiving subscriber unit 904. Subscriber unit 902 digitizes the voice data to be sent using its resident vocoder. The digitized data is forwarded to an MSC 908 through base station 906. MSC 908 determines if transliteration is required as described above. If transliteration is required, the data is transferred to service bureau 910. Service bureau 910 performs any required transliteration and forwards the transliterated data to MSC 912. If transliteration is not required, the digitized data is sent to MSC 912 through any intervening network 909. MSC 912 forwards the data to base station 914, which forwards it to receiving subscriber unit 904. The digitized data is converted back to analog using vocoder 905. In alternative embodiments, the digitized voice data is sent by subscriber unit 902 or base station 906 to service bureau 910. In addition, in alternate embodiments, service bureau 910 can send the transliterated data to base station 914 or receiving subscriber unit 904.

In the preferred embodiment, service bureau 910 is instructed which transliteration is required by any of the elements in the communication path, namely sending subscriber unit 902, receiving subscriber unit 904, base stations 906 or 914, or MSC 908 or 912. As described above, MSCs 908 and 912 can be a single MSC.

Figure 10:
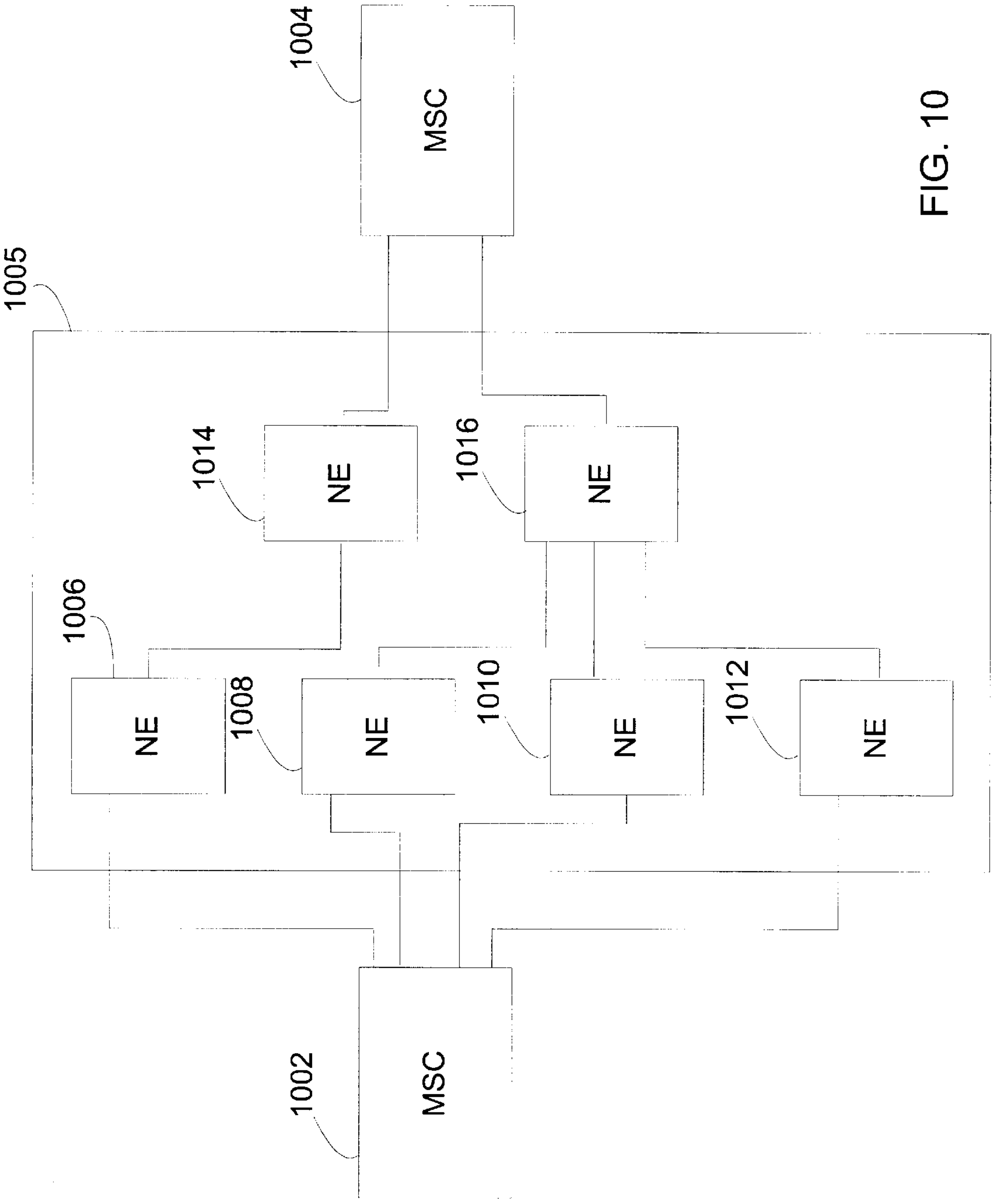
FIG. 10 is a schematic diagram of a preferred embodiment of the present invention in which a route through an intervening network is chosen.

Another aspect of the present invention is the ability to choose network architectures for transmission. Referring to FIG. 10, suppose that MSC 1002, servicing a sending subscriber unit (not shown) is sending data to MSC 1004 servicing a receiving subscriber unit (not shown). Suppose further that the sending and receiving subscribing units use the same vocoder format. Because the sending and receiving subscribing units use the same format, vocoder bypass is the preferred transmission technique.

MSC 1002 sends the data through an intervening network 1005. Intervening network 1005 contains intervening network elements (NEs) 1006, 1008, 1010, 1012, 1014 and 1016. Therefore the data travels through one of several paths containing a combination of the intervening network elements. Some of the paths might require transliteration or perform undesired transformations of the data, for example bit robbing as described above, while others may not. For example, suppose that the path from MSC 1012 through intervening network elements 1010 and 1016 requires bit robbing of the data, while the path through intervening network elements 1006 and 1014 does not. According to the preferred embodiment of the present invention, MSC 1002 negotiates with the intervening network 1005 to ensure that the path for the data is through intervening network elements 1006 and 1014. Thus, a preferred embodiment of the present invention may include the ability to negotiate with an intervening network to route around non-conforming elements to minimize encoding/decoding steps. In addition, the present invention can route to minimize voice quality degradation when transliteration is required.

An additional consideration applies to transliterations that require cascaded conversions, that is, that require more than one conversion of the same data. In such cascaded conversions, the order of the conversion is important. Preferably, the conversion that degrades the data the least is performed first, followed by the next least impact conversion and so on until the entire required cascade is complete. Performing the conversions in the order of least degradation to most degradation preserves the data to the extent possible through the conversion chain.

As described above, to communicate with one another, the data from vocoders have different formats must be transliterated in some manner. Various architectures for performing this were presented above. Tables 1–5 present the preferred conversion architecture for conversion between particular formats. Tables 1–5 are not meant to be exhaustive, and those skilled in the art will find alternate and additional conversions that can be applied using present invention.

TABLE 1

Assignment of preferred interworking solutions.

| FROM/TO | ANA-LOG | TDMA - 3X | TDMA - 6X | TDMA - DSI |
|---|---|---|---|---|
| Analog | 0 | 0 | 0 | 0 |
| TDMA - 3X | 0 | 1 | 2, 3B | 2, 3B |
| TDMA - 6X | 0 | 2, 3A, 3B | 1 | 2, 3B, 3C |
| TDMA - DSI | 0 | 2, 3A, 3B | 2, 3A, 3B, 3C | 1 |
| CDMA - 8 kbps | 0 | 2, 3B | 2, 3B | 2, 3B |
| CDMA - 13 kbps | 0 | 2, 3B | 2, 3B | 2, 3B |
| CDMA - EVRC | 0 | 2, 3B | 2, 3B | 2, 3B |
| PCS - 32 kbps | 0 | 0 | 0 | 0 |
| PCS - 16 kbps | 0 | 2, 3B | 2, 3B | 2, 3B |
| PCS - 8 kbps | 0 | 2, 3B | 2, 3B | 2, 3B |
| GSM - FULL | 0 | 2, 3B | 2, 3B | 2, 3B |
| GSM - HALF | 0 | 2, 3B | 2, 3B | 2, 3B |
| DCS - 1800 | 0 | 2, 3B | 2, 3B | 2, 3B |
| ESMR | 0 | 2, 3B | 2, 3B | 2, 3B |
| LEO Satellite | 0 | 2, 3B | 2, 3B | 2, 3B |
| INMARSAT | 0 | 2, 3B | 2, 3B | 2, 3B |

TABLE 2

Assignment of preferred interworking solutions.

| FROM/TO | CDMA - 8 kbps | CDMA - 13 kbps | CDMA - EVRC |
|---|---|---|---|
| Analog | 0 | 0 | 0 |
| TDMA - 3X | 2, 3B | 2, 3B | 2, 3B |
| TDMA - 6X | 2, 3B | 2, 3B | 2, 3B |
| TDMA - DSI | 2, 3B | 2, 3B | 2, 3B |
| CDMA - 8 kbps | 1 | 2, 3B | 2, 3B |
| CDMA - 13 kbps | 2, 3A, 3B | 1 | 2, 3B |
| CDMA - EVRC | 2, 3B | 2, 3B | 1 |
| PCS - 32 kbps | 0 | 0 | 0 |
| PCS - 16 kbps | 2, 3B | 2, 3B | 2, 3B |
| PCS - 8 kbps | 2, 3B | 2, 3B | 2, 3B |
| GSM - FULL | 2, 3B | 2, 3B | 2, 3B |
| GSM - HALF | 2, 3B | 2, 3B | 2, 3B |
| DCS - 1800 | 2, 3B | 2, 3B | 2, 3B |
| ESMR | 2, 3B | 2, 3B | 2, 3B |
| LEO Satellite | 2, 3B, * | 2, 3B, * | 2, 3B, * |
| INMARSAT | 2, 3B | 2, 3B | 2, 3B |

TABLE 3

Assignment of preferred interworking solutions.

| FROM/TO | PCS - 32 kbps | PCS - 16 kbps | PCS - 8 kbps |
|---|---|---|---|
| Analog | 0 | 0 | 0 |
| TDMA - 3X | 0, 2, 3B | 2, 3B | 2, 3B |
| TDMA - 6X | 0, 2, 3B | 2, 3B | 2, 3B |
| TDMA - DSI | 0, 2, 3B | 2, 3B | 2, 3B |
| CDMA - 8 kbps | 0, 2, 3B | 2, 3B | 2, 3B |
| CDMA - 13 kbps | 0, 2, 3B | 2, 3B | 2, 3B |
| CDMA - EVRC | 0, 2, 3B | 2, 3B | 2, 3B |
| PCS - 32 kbps | 0, 1 | 0 | 0 |
| PCS - 16 kbps | 0, 2, 3B | 0, 1 | 2, 3B |
| PCS - 8 kbps | 0, 2, 3B | 2, 3B | 1 |
| GSM - FULL | 0 | 2, 3B | 2, 3B |
| GSM - HALF | 0 | 2, 3B | 2, 3B |
| DCS - 1800 | 0 | 2, 3B | 2, 3B |
| ESMR | 0 | 2, 3B | 2, 3B |
| LEO Satellite | 0 | 2, 3B | 2, 3B |
| INMARSAT | 0 | 2, 3B | 2, 3B |

TABLE 4

Assignment of preferred interworking solutions.

| FROM/TO | GSM - FULL | GSM - HALF | DCS - 1800 |
|---|---|---|---|
| Analog | 0 | 0 | 0 |
| TDMA - 3X | 0, 2, 3B | 2, 3B | 2, 3B |
| TDMA - 6X | 0, 2, 3B | 2, 3B | 2, 3B |
| TDMA - DSI | 0, 2, 3B | 2, 3B | 2, 3B |
| CDMA - 8 kbps | 0, 2, 3B | 2, 3B | 2, 3B |
| CDMA - 13 kbps | 0, 2, 3B | 2, 3B | 2, 3B |
| CDMA - EVRC | 0, 2, 3B | 2, 3B | 2, 3B |
| PCS - 32 kbps | 0 | 0 | 0 |
| PCS - 16 kbps | 2, 3B | 2, 3B | 2, 3B |
| PCS - 8 kbps | 2, 3B | 2, 3B | 2, 3B |
| GSM - FULL | 1 | 2, 3B | 1 |
| GSM - HALF | 2, 3A, 3B | 1 | 2, 3A, 3B |
| DCS - 1800 | 1 | 2, 3B | 1 |
| ESMR | 2, 3B | 2, 3B | 2, 3B |
| LEO Satellite | 2, 3B | 2, 3B | 2, 3B |
| INMARSAT | 2, 3B | 2, 3B | 2, 3B |

TABLE 5

Assignment of preferred interworking solutions.

| FROM/TO | ESMR | LEO SATELLITE | INMARSAT |
|---|---|---|---|
| Analog | 0 | 0 | 0 |
| TDMA - 3X | 2, 3B | 2, 3B | 2, 3B |
| TDMA - 6X | 2, 3B | 2, 3B | 2, 3B |
| TDMA - DSI | 2, 3B | 2, 3B | 2, 3B |
| CDMA - 8 kbps | 2, 3B | 2, 3B, * | 2, 3B |
| CDMA - 13 kbps | 2, 3B | 2, 3B, * | 2, 3B |
| CDMA - EVRC | 2, 3B | 2, 3B, * | 2, 3B |
| PCS - 32 kbps | 0 | 0 | 0 |
| PCS - 16 kbps | 2, 3B | 2, 3B | 2, 3B |
| PCS - 8 kbps | 2, 3B | 2, 3B | 2, 3B |
| GSM - FULL | 2, 3B | 2, 3B | 2, 3B |
| GSM - HALF | 2, 3B | 2, 3B | 2, 3B |
| DCS - 1800 | 2, 3B | 2, 3B | 2, 3B |
| ESMR | 1 | 2, 3B | 2, 3B |
| LEO Satellite | 2, 3B | 1 | 2, 3B |
| INMARSAT | 2, 3B | 2, 3B | 1 |

The following definitions apply to Tables 1–5.

0—None Required

1—Vocoder Bypass

2—Common Inter-Working Facility

3A—Vocoder Impersonation

3B—Vocoder Translation

3C—Vocoder Substitution.

The following notes apply to Tables 1–5:

PCS 32 kbps, PCS 16 kbps, and PCS 8 kbps are definitions of typical coding rates that may be used by the numerous technologies being considered for 2 GHz PCS. They are representative labels and no forward/backward compatabilities are implied. Each should be considered as a stand-alone technology.

PCS 32 kbps is considered to be of such a quality that is equivalent to analog for interworking purposes. PCS 16 kbps is considered to be of a quality level that interworking to anything of equal or greater quality is equivalent to interworking with analog.

Certain of the LEO satellite systems may utilize vocoders common to terrestrial CDMA systems. For those cases solutions are 1, 2, 3A, 3B.

Though described above with respect to wireless voice, the present invention applies to transmitting wireline voice as well. Wireline voice is increasingly transmitted over computer networks as data. Consequently, wireline service providers will face similar issues to those faced in by wireless service providers described above. Moreover, the vocoders being used by wireline service providers are not compatible with the vocoders used by wireless service providers. Consequently, the techniques described above will be of vital importance in connecting telephony traffic between wireless and wireline service providers.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for reducing degradation of analog voice data that must be encoded and decoded using a vocoder, comprising:

(a) a sending device having a vocoder utilizing a first vocoder format to encode the analog voice data to digitized data;

(b) a transliterator to transliterate the digitized data to transliterated data having a second vocoder format to reduce degradation to the digitized data caused by encoding and decoding during transmission of the digitized data from the sending device, wherein the second vocoder format is selected from a plurality of vocoder formats after the transliterator uses each of the plurality of vocoder formats to process the digitized data, analyzes the digitized data after the process, and determine that the second vocoder format results in the least amount of degradation in transmitting the digitized data; and (c) a receiving device for receiving the transliterated data from the sending device, the receiving device having a vocoder utilizing a third vocoder format to convert the transliterated data back to the analog voice data.

2. The system recited in claim 1, further comprising a first MSC to receive the digitized data and transliterate the digitized data to a common data format that is different from the first vocoder format and the third vocoder format as transliterated data.

3. The system recited in claim 2, further comprising a second MSC to receive the transliterated data and convert it from the common format to a format that is understood by the vocoder in the receiving device.

4. The system recited in claim 1, further comprising a first MSC to receive the digitized data and transliterate the digitized data to a substitute vocoder format as transliterated data.

5. The system recited in claim 4, further comprising a second MSC to receive the transliterated data and convert it from the substitute vocoder format to a format that is understood by the vocoder in the receiving device.

6. The system recited in claim 1, wherein the transliterator converts the digitized data to a format that is different from one or both of the first and second vocoder formats.

7. The system recited in claim 1, wherein the vocoder in the receiving device can impersonate a plurality of vocoder formats, wherein the vocoder in the sending device impersonates the vocoder format of the vocoder in the receiving device.

8. The system recited in claim 1, wherein the transliterator is bypassed if the second vocoder format is the same as the first vocoder format, further comprising a data massager to process the digitized data prior to its transmission over an intervening network having at least one intervening network element, the data processor processing the data to substantially reduce the effect of the at least one intervening network element on the digitized data as it propagates through the intervening network.

9. The system recited in claim 8, wherein the receiving device further comprising a de-massager to de-massage the massaged digitized voice data.

10. The system recited in claim 1, wherein when the third vocodor format is the same as the second vocodor format, the receiving device bypasses the transliterated data and covert the transliterated data back to analog voice data.

11. A method for transmitting digitized voice data from a sending device to a receiving device that minimizes degradation on the quality of the voice data, comprising:

converting analog voice data to the digitized voice data in a first vocoder utilizing a first vocoder format;

determining whether the digitized data requires transliteration;

if the transliteration is required, transliterating the digitized data to transliterated data with a second vocoder format to reduce degradation of the transliterated data when it is transmitted to the receiving device from the sending device, wherein the second vocoder format is selected from a plurality of vocoder formats after using each of the plurality of vocoder formats to process the digitized data, analyzing the digitized data after the process, and determining that the second vocoder format results in the least amount of degradation in transmitting the digitized data;

if the transliteration is not required transmitting the digitized data with the first vocoder format to the receiving device; and transmitting the transliterated data with the second vocoder format to the receiving device if transliteration is required.

12. The method for transmitting digitized voice data recited in claim 11, further comprising the step of impersonating a vocoder implemented on the receiving device.

13. The method for transmitting digitized voice data recited in claim 12, further comprising:

converting the digitized data to a vocoder format used by the receiving device; and bypassing the digitized data with the receiving device's vocoder format to the receiving device.

14. The method for transmitting digitized voice data recited in claim 11, further comprising the step of translating the digitized data to a format of another vocoder.

15. The method for transmitting digitized voice data recited in claim 11, wherein when no transliteration is required, further comprising the steps of:

(a) transmitting the digitized data through an intervening network having intervening network elements; and (b) massaging the digitized data in accordance with one or more transmission characteristics of an intervening network.

16. The method for transmitting digitized voice data recited in claim 15, wherein the sending and receiving devices are MSCs, further comprising the step of bypassing the vocoders in the MSCs.

17. The method for transmitting digitized voice data recited in claim 15, wherein the sending and receiving devices are base stations, further comprising the step of bypassing the vocoders in the base stations.

18. The method for transmitting digitized voice data recited in claim 11, further comprising the step of selecting the vocoder format in the sending device in accordance with the vocoder format of the receiving device.

19. The method for transmitting digitized voice data recited in claim 11, further comprising the steps of:

(a) selecting a common vocoder format;

(b) converting the analog voice data to digital voice data in accordance with the common vocoder format as transliterated data; and (c) transmitting the transliterated data to the receiving device.

20. The method for transmitting digitized voice data recited in claim 19, wherein the receiving device is a receiving subscriber unit, further comprising the steps of:

(a) converting the transliterated data to a vocoder format that the receiving device can decode; and (b) transmitting the converted data to the receiving device.

21. The method of claim 17, further comprising selecting the first vocoder format from a predetermined list of vocoder formats whereby the first vocoder format results in the least amount of degradation when transliterated from the first vocoder format to the second vocoder format.

22. The method of claim 21, wherein the selection of the first vocoder is performed by a universal vocoder.

23. The method for transmitting digitized voice data in claim 11, further comprising the step of substitue a vocoder implemented on the receiving device.

24. The method for transmitting digitized voice data in claim 23, further comprising:

communicating between the sending device and the receiving device to determine which vocoder format to use, where the vocoder format can be used by both of the sending device and the receiving device, if no proper vocoder format is available through the communication, downloading a proper vocoder format from a vocoder storage area.

25. The method for transmitting digitized voice data in claim 11, wherein the second vocoder format is a common vocoder format that can be used for both of the sending device and the receiving device.

26. The method for transmitting digitized voice data in claim 11, wherein the sending device comprises a universal decoder for converting the voice data to any desired vocoder format.

27. A system for reducing degradation to analog voice data due to encoding and decoding comprising:

a first switch to receive digitized data representative of the analog voice data from a sending base station that receives the digitized data representative of the analog voice data from a sending subscriber unit;

a first transliterator in the first switch to transliterate the digitized voice data to a first vocoder format that reduces degradation of the digitized voice data when the digitized voice data is transmitted from the sending subscriber unit through a transmission network to a receiving subscriber unit by selecting the first vocoder format that is most compatible with a second vocoder format utilized by the receiving subscriber unit;

a second switch to receive the transliterated data from the first switch; and a second transliterator in the second switch to convert the transliterated data to digitized data representative of the analog voice data in the second vocoder format that a second vocoder in the receiving subscriber unit can process, and wherein at least one of the first and second vocoder format is selected from a plurality of vocoder formats after the first and second transliterator uses each of the plurality of vocoder formats to process the digitized data, analyzes the digitized data after each transliteration, and determines that the first or the second vocoder format results in the least amount of degradation in transmitting the digitized data.

28. The system recited in claim 27, wherein the first transliterator is a universal vocoder.

29. The system recited in claim 27, where in the first transliterator translates the digitized data into another vocoder format and the second transliterator translates the data from the another vocoder format to a vocoder format that the second vocoder can process.

30. The stem recited in claim 29 wherein the first transliterator converts the digitized data to a common format and the second transliterator converts the data in the common format to a vocoder format that the second vocoder can process.

31. The method of claim 17, further comprising selecting a third, intervening, vocoder format for transliterating between the first and second vocoder formats that results in the least amount of degradation when the first vocoder format is transliterated into the third vocoder format and the third vocoder format is transliterated into the second vocoder format.

32. A system for reducing degradation of analog voice data to be encoded and decoded using a vocoder, comprising:

(a) a sending device having a first vocoder to encode the analog voice data to digitized data utilizing a first vocoder format;

(b) a second vocoder to receive the digitized data, and encode the digitized data to a second vocoder format;

(c) a third vocoder to received the data in the second vocoder format, and decode the data in the second vocoder format to digitized data;

(d) a receiving device having a fourth vocoder to receive the digitized data and convert the digitized data back to analog voice data;

(e) a transliterator to transliterate the digitized data to reduce degradation to the data caused by encoding and decoding during transmission from the sending device to the receiving device; wherein the transliterator transliterates the digitized data with a vocoder format, wherein the vocoder format is selected from a plurality of vocoder formats after the transliterator uses each of the plurality of vocoder forms to process the digitized data, analyzes the digitized data after the process, and determines a vocoder format that result in a least amount of degradation in transmitting the digitized voice data; and (f) bypass means for bypassing the second and third decoders such that the digitized data is sent to the receiving device without further encoding, wherein the bypass means processes the digitized data to reduce its degradation when transmitted from the sending device to the receiving device over an intervening network.

* * * * *